United States Patent
Laporta

(10) Patent No.: US 6,779,749 B2
(45) Date of Patent: Aug. 24, 2004

(54) CORD TAKE-UP REEL FOR ELECTRIC POWERED LAWN MOWER

(76) Inventor: Gilbert Laporta, 109, de Poitou, St-Lambert, (Québec) (CA), J4S 1C9

( * ) Notice: Subject to any disclaimer, the term of this patent is extended or adjusted under 35 U.S.C. 154(b) by 0 days.

(21) Appl. No.: 10/310,268

(22) Filed: Nov. 21, 2002

(65) Prior Publication Data

US 2004/0099760 A1 May 27, 2004

(51) Int. Cl.[7] ............... B65H 75/38; B65H 75/42
(52) U.S. Cl. ............... 242/395; 242/403; 242/404; 56/16.7
(58) Field of Search ............... 242/395, 395.1, 242/403, 404, 404.2; 56/16.7; 191/12.2 R, 12.4

(56) References Cited

U.S. PATENT DOCUMENTS

| | | | |
|---|---|---|---|
| 1,469,603 A | | 10/1923 | Peters |
| 2,498,609 A | | 2/1950 | Reil |
| 2,673,366 A | * | 3/1954 | Johnson .................. 56/16.7 |
| 2,690,892 A | | 10/1954 | La Bar |
| 2,721,711 A | * | 10/1955 | Torzewski ............... 242/404.2 |
| 2,728,182 A | | 12/1955 | Fulton et al. |
| 3,698,656 A | * | 10/1972 | Ballenger ................ 242/404 |
| 3,719,331 A | * | 3/1973 | Harsch .................... 242/404 |
| 4,050,180 A | * | 9/1977 | King ........................ 242/404 |
| 4,136,840 A | | 1/1979 | Bates |
| 6,186,433 B1 | * | 2/2001 | Kovacik et al. .......... 242/395 |

* cited by examiner

Primary Examiner—John M. Jillions
(74) Attorney, Agent, or Firm—François Martineau

(57) ABSTRACT

An electric-powered lawnmower having a manoeuvering planar handle, a reel member having a hollow shaft and a pair of integral spaced apart spokes for winding an electrical extension cord therebetween. A reel support polygonal panel having a transverse socket engages the hollow shaft, wherein the shaft is freely rotatable within the socket. The panel defines two opposite side edge portions forming registering concave cavities. An anchor bar member has attachment members anchoring the anchor member to the lawnmower planar handle generally coplanar thereto. The anchor bar member includes a dovetail cavity, frictionally wedgingly yet releasably receiving the panel concave cavities. The reel member socket defines a rotational axis generally orthogonal to the plane of the planar handle.

15 Claims, 5 Drawing Sheets

CORD TAKE-UP REEL FOR ELECTRIC POWERED LAWN MOWER

FIELD OF THE INVENTION

This invention relates to reel devices for electrical cords, and more particularly, to reel devices designed for use with electric-powered lawnmowers.

BACKGROUND OF THE INVENTION

When operating a lawn mower of the electrically powered type, the machine needs to be connected by an electrical cord to a remote plug-in location where electrical power is generated. This means that the electrical cord lays across the lawn to be mowed by the lawn mower. There is therefore the constant hassle of having to clear the way ahead of the machine, otherwise the electrical cord may be accidentally cut by the lawn mower high speed rotating blade. An operator always need to be careful in this regard. The handling of the electrical cord, during lawn mowing operation as well as before and after use, is therefore an inefficiency in operation of the electric lawnmower.

It is believed that improvements are needed in this area.

OBJECT OF THE INVENTION

The gist of the present invention is to further improve upon manually operable take-up reel for electrical cords, which is easily and detachably mounted on new or pre-existing lawn mowers.

SUMMARY OF THE INVENTION

In accordance with the object of the invention, there is disclosed a reel support for use in releasably supporting a reel member against a lawnmower planar handle, said reel support comprising:—a rigid support main frame, for rotatable engagement with the reel member;—a generally planar anchor bar member having attachment members, for anchoring said anchor member to the lawnmower handle substantially coplanar thereto; and—wedge means, frictionally yet releasably interlocking said support main frame and said anchor bar member for rotation of the reel member along a plane generally parallel to the plane of said anchor bar member.

Said support main frame could consist of a polygonal panel, said wedge means including a bevelled cavity made into said anchor bar member and a pair of invaginated concavities made along opposite edge portions of said polygonal panel, said concavities complementarily shaped to said bevelled cavity for releasable frictional wedge interaction therewith. Said support main frame could consist of a flat polygonal panel, and including an aperture, made into an upper edge portion of said panel for hand engagement of said aperture for facilitating handling of said panel. A hook cavity could be made into said aperture of said panel, said hook cavity for frictionally receiving the end portion of the electric cord when winded fully inside the reel and not in use.

The invention also relates to the combination of a reel member for winding an electrical extension cord, a reel support for releasably supporting said reel member against a lawnmower planar handle, mounting means rotatively mounting said reel member to said reel support,—a generally planar anchor bar member having attachment members, for anchoring said anchor member to the lawnmower handle substantially coplanar thereto; and—wedge means, frictionally yet releasably interlocking said support main frame and said anchor bar member, wherein said reel member rotates along an axis generally orthogonal to a plane along which extends said anchor bar member.

In this latter invention, said support main frame could consist of a polygonal panel, said wedge means including a bevelled cavity made into said anchor bar member and a pair of invaginated concavities made along opposite edge portions of said polygonal panel, said concavities complementarily shaped to said bevelled cavity for releasable frictional wedge interaction therewith. Said mounting means could include a tubular hollow shaft, integral to said reel member, and a tubular socket integral to said panel, said socket releasably engaged into said hollow socket, each of said socket and hollow shaft being preferably cylindrical and defining a first outer end and a second outer end respectively, both said first outer end and said second outer end coming in register with one another; and further including a closure cap, rotatably releasably interengaging said first outer end and said second outer end to prevent accidental release of said reel member from said socket. At least one electrical cord guide member could transversely project freely from said panel. Said reel member could include a pair of inner wheel member and outer wheel member laterally spaced from one another and radially projecting from opposite ends of said hollow shaft integrally thereof, at least one cord retaining hook member transversely projecting from said outer wheel member, said hook member for releasably retaining a portion of the electrical extension cord.

The invention also relates to an electric-powered lawnmower per se, having a manoeuvering planar handle, a reel member having a hollow shaft and a pair of integral spaced apart spokes for winding an electrical extension cord therebetween, a reel support polygonal panel having a transverse socket engaging said hollow shaft wherein said shaft is freely rotatable within said socket, said panel defining two opposite side edge portions forming registering concave cavities;—a generally planar anchor bar member having attachment members, anchoring said anchor member to said lawnmower planar handle generally coplanar thereto, and a dovetail cavity frictionally wedgingly yet releasably receiving said panel concave cavities; wherein said reel member socket defines a rotational axis generally orthogonal to the plane of said planar handle.

DETAILED DESCRIPTION OF THE PREFERRED EMBODIMENT

Figure 1:
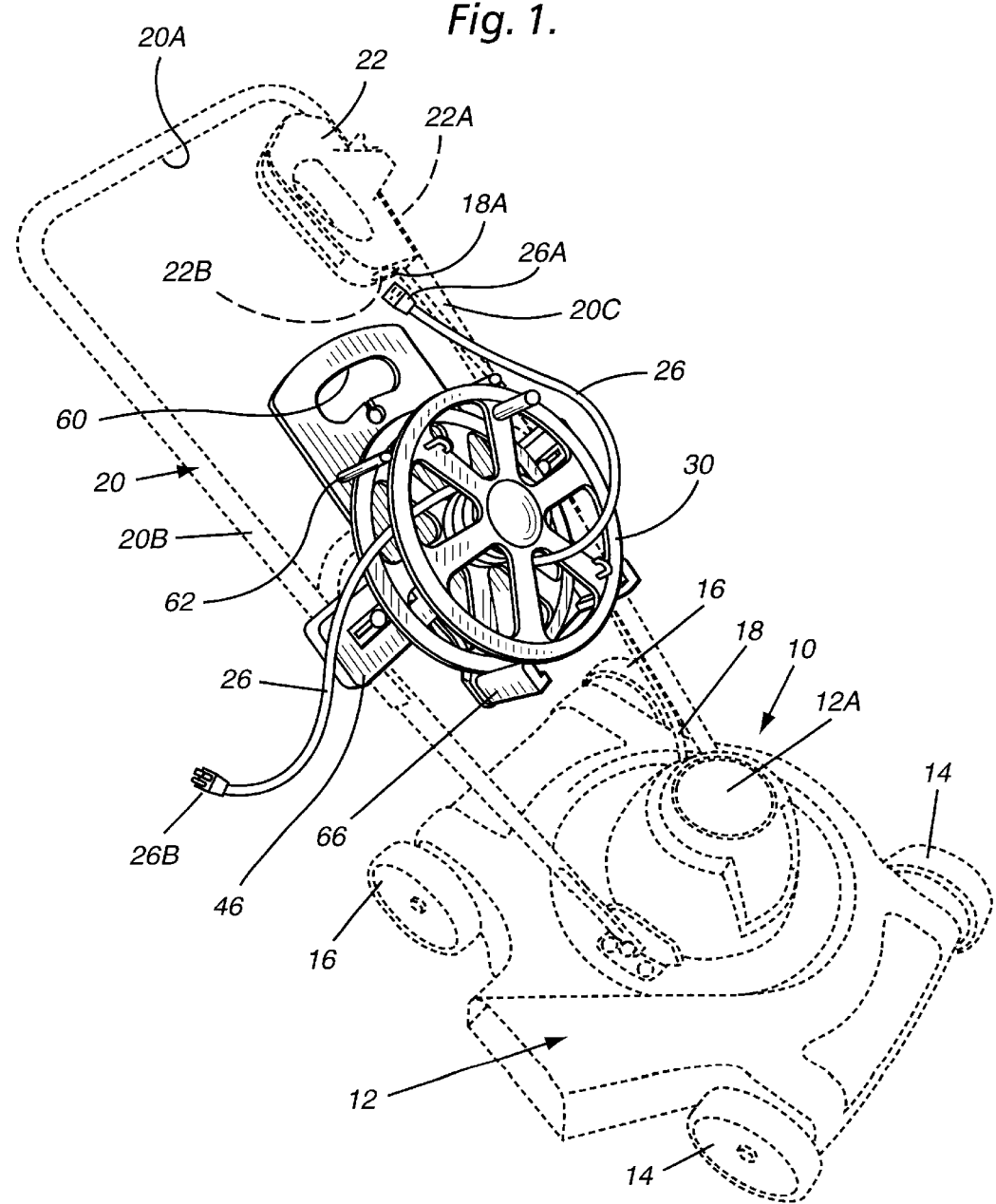
FIG. 1 is a perspective view of an electric lawn mower, shown in phantom lines, and further showing in full lines the electrical cord reel, the electrical cord wound around the reel and the reel support assembly.
Figure 2:
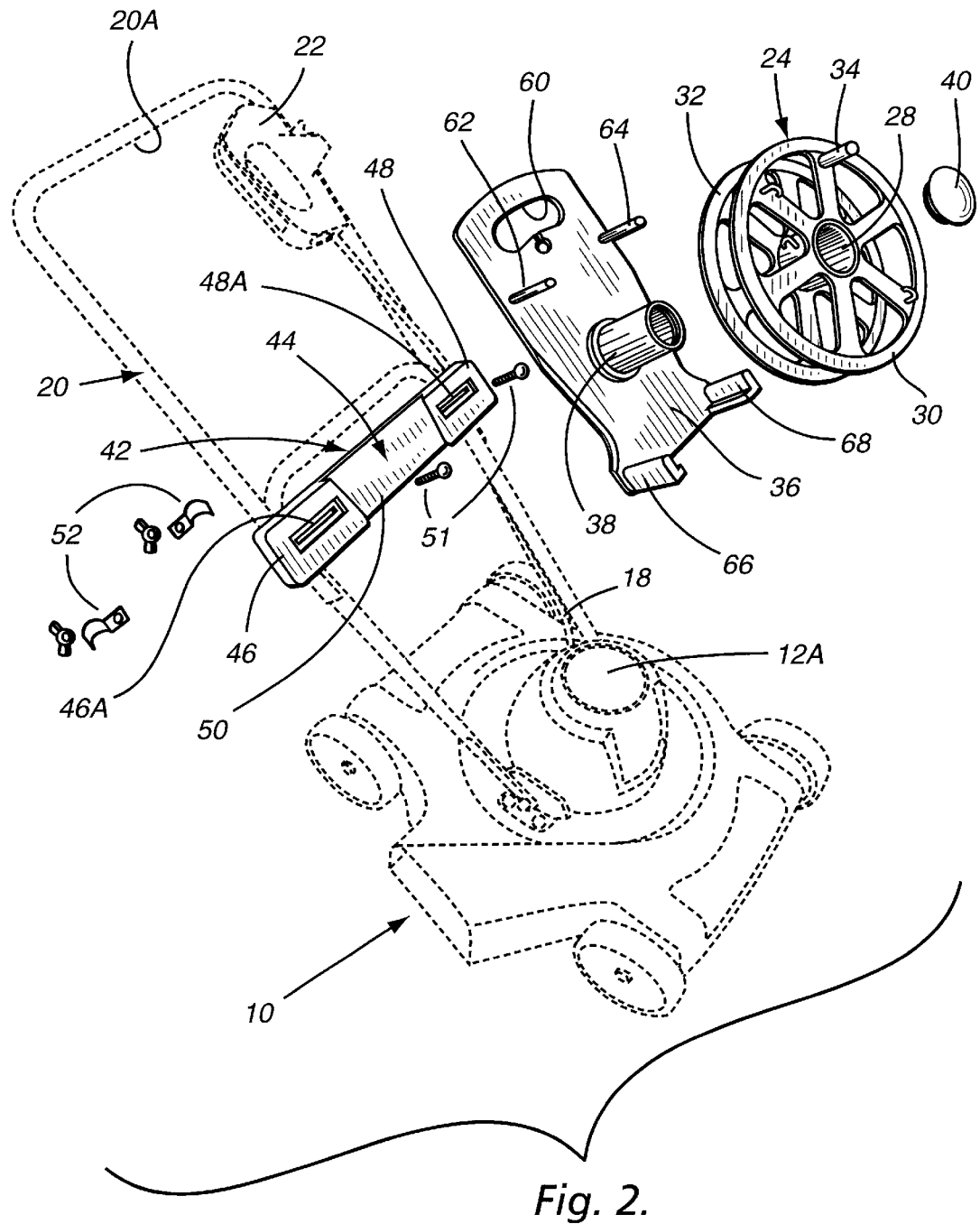
FIG. 2 is a view similar to FIG. 1, but at a smaller scale and showing the reel and reel support assembly in exploded view.

The electric lawn mower 10 illustrated in FIGS. 1 and 2 conventionally includes a casing 12 supported rollingly spacedly over ground by a pair of front wheels 14 and a second pair of rear wheels 16. An electrical motor (not shown) is lodged at a central location 12A centrally inside the casing 12, and is powered by electrical sector AC current via an electrical cord 18 projecting therefrom. The electrical motor rotatably drives at least one blade (not shown) having a long sharp edge, this blade for shearingly cutting the upper section of grass tufts on a lawn. A tubular open arcuate handle 20 (e.g. generally inversely U-shape) projects rearwardly upwardly from casing 12. An ignition and motor speed control unit 22 is mounted at a top web portion 20A of handle 20, at arms length of the operator, and the plug 18A of electrical cord 18 is inserted into a socket 22A integral to control unit 22.

Figure 3:
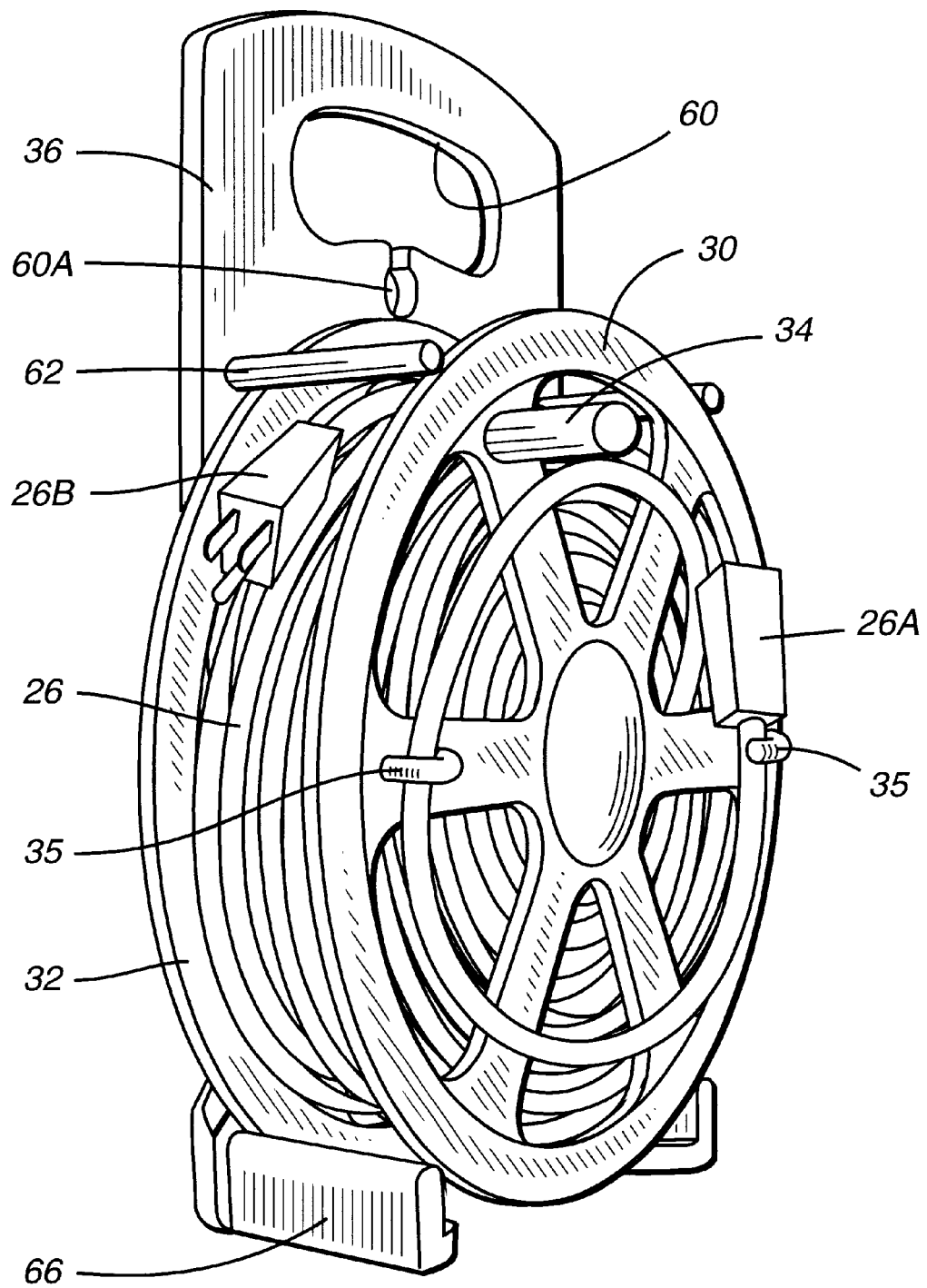
FIG. 3 is a perspective view at an enlarged scale of the reel support assembly, reel and electrical cord of FIG. 1.

Now, according with the invention, there is provided a reel member 24, around which can be wound an electrical extension cord 26. Extension cord 26 has at one end a socket 26A, for operative connection with a complementary plug 22B at control unit 22, and at the opposite other end a plug 26B, for operative connection to a remote AC wall socket (e.g. from a building) connected to an electrical power generator source. Socket 22A and plug 22B of control unit 22 are electrically interconnected. Reel member 24 includes a cylindrical hollow shaft 28, and a pair of enlarged wheel members 30, 32, radially projecting from opposite ends of shaft 28 and integral thereto. Preferably, a rotating hand lever 34 projects transversely outwardly from a portion of the radially outer end of outer wheel member 30, integrally thereto. Preferably also, and as best illustrated in FIG. 3, there is provided a few hooks 35 projecting outwardly transversely from outer wheel member 30, for retaining the end portion of electric cord socket end 26A when released from control unit 22.

A separate support panel 36 is further provided. Support panel 36 is generally planar and generally polygonal, for example generally quadrangular, and includes a socket member 38 projecting transversely from a central portion thereof. Socket member 38 is sized for free through engagement into the hollow of hollow shaft 28 of reel member 24, wherein reel member 24 is rotatably carried by support panel 36 around socket member 38. A friction cap 40 may be provided to close the outer end of socket member 38 and to rotatably releasably interengage reel member 24 to socket member 38. In this way, reel member 24 cannot accidentally release from support panel 36 when extension cord 26 is unwound from reel member 24. Support panel 36 is adapted to be mounted to the lawn mower handle 20, via bar 44 (see below).

Figure 4:
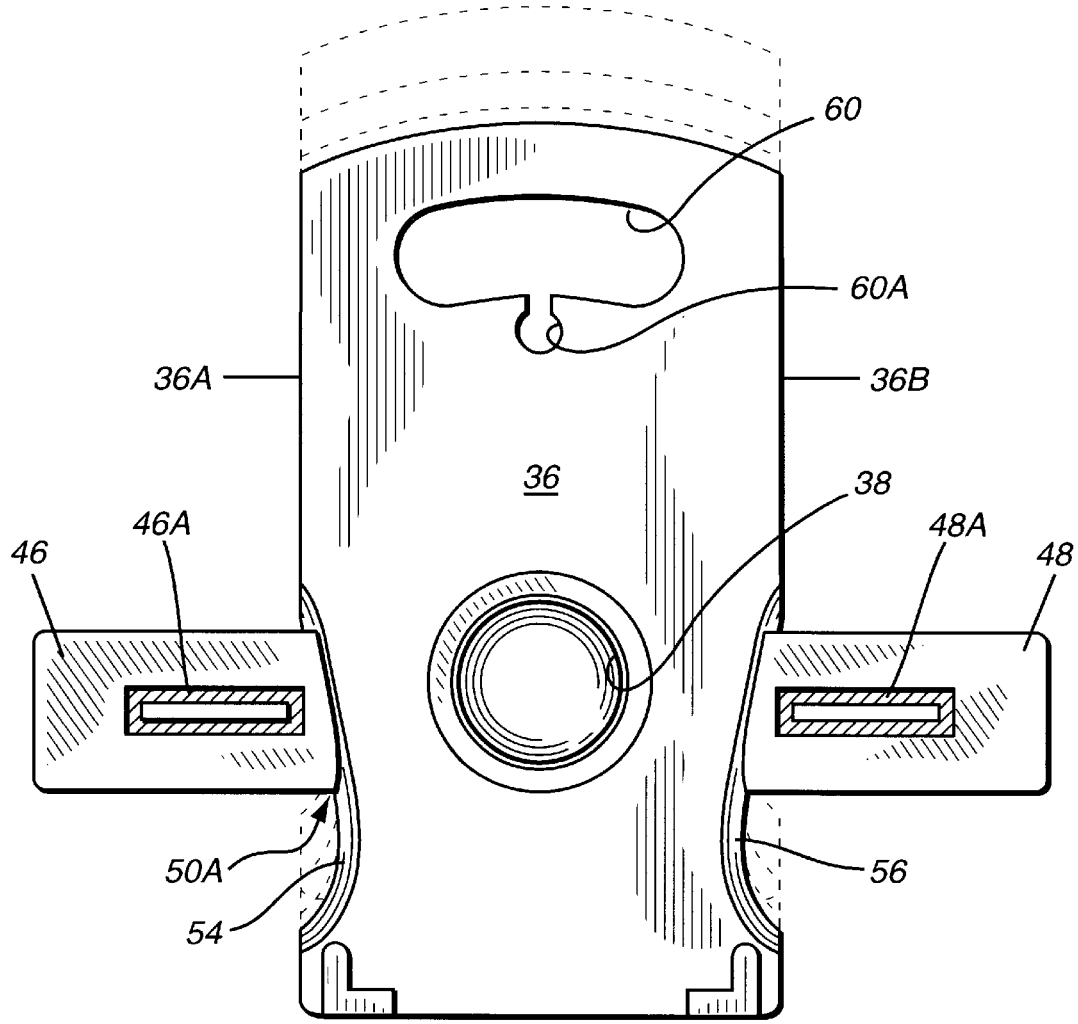
FIG. 4 is a partly sectional front plan view of the reel support assembly, suggesting in phantom view the release play of the support panel relative to the wedge block.
Figure 5:
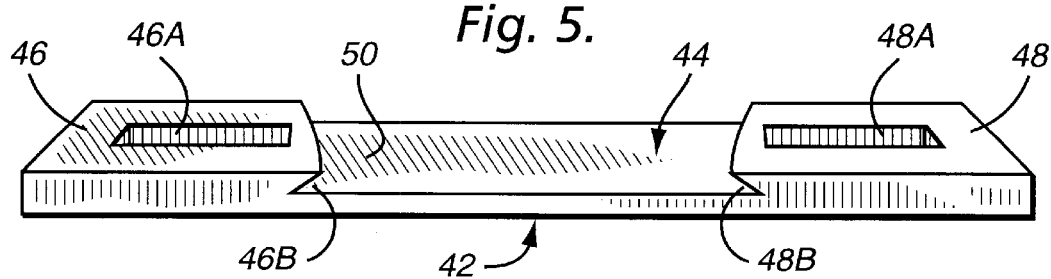
FIG. 5 is a front edge view of the wedge block of FIG. 4.
Figure 6:
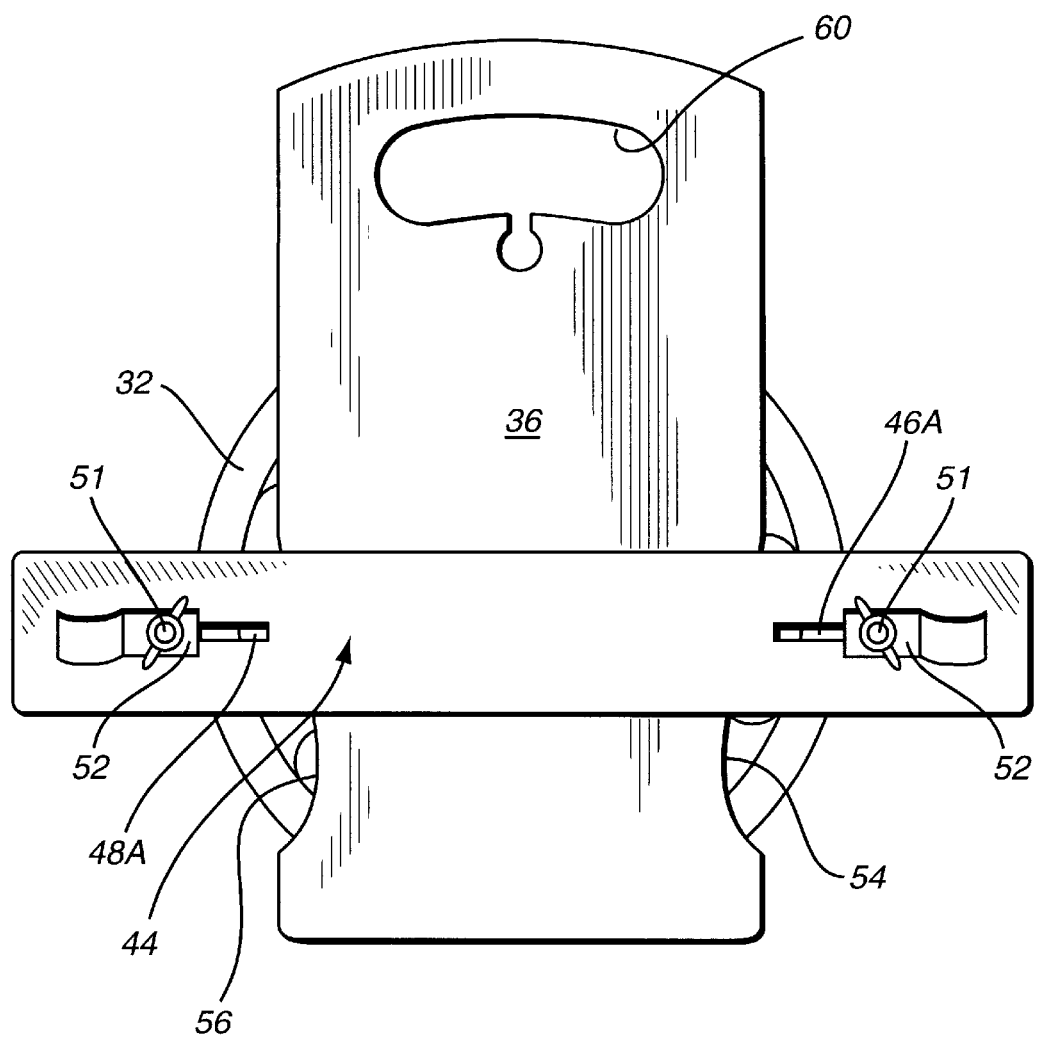
FIG. 6 is a rear plan view of the reel support assembly and reel of FIG. 3.

Anchor means 42 are provided to releasably anchor support panel 36 against an intermediate section of the lawn mower handle 20. In one preferred embodiment illustrated in FIGS. 2 and 5 of the drawings, anchor means 42 includes a rectangular bar 44 having opposite end portions 46, 48, and an intermediate front cavity 50. Each end portion 46, 48, includes an ovoïdal slot 46A, 48A, for passage of screw members 51, for adjustable releasable anchoring of end portions 46, 48, with bracket members 52 to the two lateral legs 20B, 20C, respectively of the lawn mower handle 20. Ovoïdal slots 46A, 48A, enable adjustment of bar 44 to lawnmower handles 20 of the varying sizes. Cavity 50 forms a wedge means, in that its two sides—on the inner edge portions 46B, 48B, of the bar end portions 46, 48, respectively—are downwardly inwardly bevelled. Moreover, as shown in FIG. 4, the section of support panel 36 intermediate its length is narrowed, forming a concave invagination 54, 56, along each opposite lateral edges 36A, 36B, in register with socket member 38. The distance between the troughs of support panel edge invaginations 54, 56, is smaller than the minimum width of bar wedge cavity 50, but the distance between support panel lateral edges 36A, 36B, is greater than this minimum width of bar wedge cavity 50. That is to say, and as suggested sequentially by FIGS. 2 and 4, support panel 36 is engageable freely transversely (e.g. toward the rear of the lawn mower) across the open mouth 50A (FIG. 4) of cavity 50 and into cavity 50, and can then become frictionally interlocked therein by downwardly sinking support panel 36 transversely of wedge bar 44. As support panel 36 moves transversely relative to bar 44 into cavity 50, the bevelled edge portions 46B, 48B, of bar 44 become lockingly wedged against the upper portions of the lateral side edge concavities 54, 56, of support panel 36.

After use, to remove the support panel 36 from the wedge bar 44, one needs only, firstly, to manually pull support panel 36 upwardly, just enough so that the lateral side edge concavities 54, 56, of panel 36 release the bevelled edge portions 46B, 48B, of bar 44, and then lastly, to pull the panel 36 forwardly away from the plane of wedge bar 44, to release the cavity 50 and pass through cavity mouth 50A. It is understood that no tool is required to install or remove support panel 36 and associated reel member 24 against the handle 20 of lawn mower 10. For removal of the wedge bar 44, wing nuts can be manually screwed, but wedge bar 44 may also remain a permanent component of the lawn mower 10 since it remains an inconspicuous added component thereof, extending generally within the plane of handle 20.

Preferably, as illustrated in FIG. 4, an ovoïdal aperture 60 is made at an upper portion of support panel 36, for hand engagement for facilitating handling of support panel 36 when required. Ovoïdal aperture 60 may include a lower intermediate cavity 60A, for frictionally receiving the end portion of electrical extension cord when not in use . As suggested in FIGS. 2–3, at least one of the four corner portions, and preferably all four corner portions of support panel 36 could each be fitted with an integral transverse guide arm, 62, 64, 66, 68, so as to guide winding of electrical extension cord 26 around reel member 24, as well as to substantially prevent accidental unwinding of the electrical extension cord 26.

Obviously, the distance between support panel socket member 38 and each of transverse guide arms 62–68, should be greater than the radial width of any of reel member wheel members 30, 32, so that guide arms 62–68 do not hamper free rotation of reel member 24. Upper corner guide arms 62, 64, could simply be smaller cylindrical studs, as shown, whereas lower corner guide arms 66, 68, could be larger right angle studs. However, lower corner arms 66, 68, work mainly as ground stands for support in upright condition of assembled components 44, 36, 24, when released from lawn mower and not in use.

It is understood that the present invention may be easily retrofitted to existing lawn mowers, or could be provided on new lawn mowers either as a standard feature or as an optional one. Also, the reel support could be used detached from the lawn mower, for other applications using electrical wires, for example against a wall mount, or on an electric snow blower. This reel support is removably mounted.

What is claimed is:

1. A reel support for use in releasably supporting a reel member against a lawnmower planar handle, said reel support comprising:

a rigid support main frame, for rotatable engagement with the reel member;

a generally planar anchor bar member having attachment members, for anchoring said anchor member to the lawnmower handle substantially coplanar thereto; and wedge meals, frictionally yet releasably interlocking said support main frame and said anchor bar member for rotation of the reel member along a plane generally parallel to the plane of said anchor bar member;

wherein said support main frame consists of a polygonal panel, said wedge means includes a bevelled cavity made into said anchor bar member and a pair of invaginated concavities made along opposite edge portions of said polygonal panel, said concavities complementarily shaped to said bevelled cavity for releasable frictional wedge interaction therewith.

2. A reel support us in claim 1, further including an aperture, made into an upper edge portion of said panel for hand engagement of said aperture for facilitating handling of said panel.

3. In combination, a reel member for winding an electrical extension cord, a reel support for releasably supporting said reel member against a lawnmower planar handle, mounting means rotatively mounting said reel member to said reel support.

a generally planar anchor bar member having attachment members, for anchoring said anchor member to the lawnmower handle substantially coplanar thereto; and wedge means, frictionally yet releasably interlocking said support main frame and said anchor bar member, wherein said reel member rotates along an axis generally orthogonal to the plane along which extends said anchor bar member;

wherein said support main frame consists of a polygonal panel, said wedge means includes a bevelled cavity made into said anchor bar member and a pair of invaginated concavities made along opposite edge portions of said polygonal panel, said concavities complementarily shaped to said bevelled cavity for releasable frictional wedge interaction therewith.

4. The combination of claim 3, wherein said a tubular hollow shaft, integral to said reel member, and a tubular socket integral to said panel, said socket releasably engaged into said hollow shaft, each of said socket and hollow shaft defining a first outer end and a second outer end respectively, both said first outer end and said second outer end coming in register with one another; and further including a closure cap, rotatably releasably interengaging said first outer end and said second outer end to prevent accidental release of said reel member from said socket.

5. The combination as in claim 3, further including at least one electrical cord guide member, transversely projecting freely from said panel.

6. The combination as in claim 3, wherein each of said socket and of said hollow shaft is cylindrical.

7. The combination as in claim 3, with said reel member including a pair of inner wheel member and outer wheel member laterally ,spaced from one another, radially projecting from opposite ends of said hollow shaft integrally thereof, at least one cord retaining hook member transversely projecting from said outer wheel member, said hook member for releasably retaining a portion of the electrical extension cord.

8. An electric-powered lawnmower having a manoeuvering planar handle, a reel member having a hollow shaft and a pair of integral spaced apart spokes for winding an electrical extension cord therebetween, a reel support polygonal panel having a transverse socket engaging said hollow shaft wherein said shaft is freely rotatable on said socket, said panel defining two opposite side edge portions forming registering coneave cavities:

a generally planar anchor bar member having attachment members, anchoring said anchor member to said lawnmower planar handle generally coplanar thereto, and a dovetail cavity frictionally wedgingly yet releasably receiving said panel concave cavities;

wherein said reel member hollow shaft defines a rotational axis generally orthogonal to the plane of said planar handle.

9. A lawnmower as in claim 8, wherein said panel is generally quadrangular.

10. A lawnmower as in claim 8, wherein said panel further includes an hand aperture, made into an upper edge portion of said panel for hand engagement of said aperture for facilitating handling of said panel.

11. A lawnmower as in claim 8, wherein said hollow shaft and said socket are each tubular and define a first outer end and a second outer end respectively, both said first outer end and said second outer end coming in register with one another; and further including a closure cap, rotatably releasably interengaging said first outer end and said second outer end to prevent accidental release of said reel member from said socket.

12. A lawnmower as in claim 8, further including at least one electrical cord guide member, transversely projecting freely from said support panel.

13. A lawnmower as in claim 11, wherein each of said socket and of said hollow shaft is cylindrical.

14. A lawnmower as in claim 8, further including at least one cord retaining hook member, transversely projecting freely from an outer one of said reel member spokes, said hook member for releasably retaining an end portion of the electrical extension cord.

15. A lawnmower as in claim 10, further including a hook cavity made into said panel, said hook cavity for frictionally receiving the end portion of the electrical extension cord when the latter is wound fully inside the reel member and not in use.

* * * * *